United States Patent [19]
Miller et al.

[11] 3,897,861
[45] Aug. 5, 1975

[54] INFLATABLE EVACUATION SLIDE INTERMEDIATE RELEASE SYSTEM

[75] Inventors: Ralph A. Miller, Monmouth Beach; Edward H. Smialowicz, Point Pleasant, both of N.J.

[73] Assignee: The Garrett Corporation, Los Angeles, Calif.

[22] Filed: Aug. 13, 1973

[21] Appl. No.: 387,997

[52] U.S. Cl. ............... 193/25 B; 182/48; 244/137 P
[51] Int. Cl.² ..................... B65G 11/10; A62B 1/20
[58] Field of Search .............. 182/48; 193/25 B; 244/137 P

[56] References Cited
UNITED STATES PATENTS

| | | | |
|---|---|---|---|
| 3,018,867 | 1/1962 | Heyniger | 182/48 X |
| 3,391,771 | 7/1968 | Day | 193/25 B |
| 3,463,266 | 8/1969 | Day | 193/25 B X |
| 3,463,287 | 8/1969 | Smith | 182/48 X |
| 3,606,939 | 9/1971 | Summer et al. | 193/25 B |
| 3,669,217 | 6/1972 | Fisher | 193/25 B X |

*Primary Examiner*—Richard A. Schacher
*Assistant Examiner*—James L. Rowland
*Attorney, Agent, or Firm*—Albert J. Miller

[57] ABSTRACT

Disclosed is an intermediate release system for an inflatable evacuation slide.

13 Claims, 6 Drawing Figures

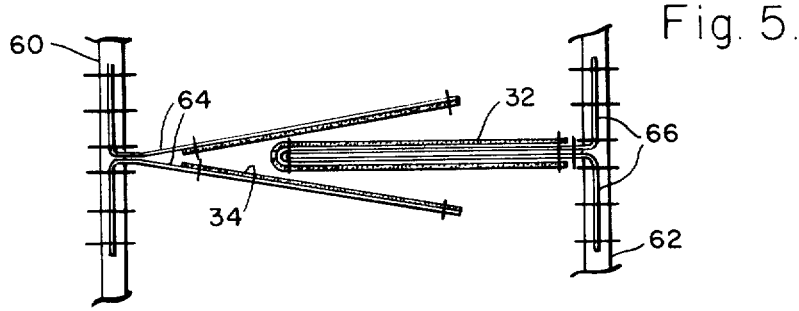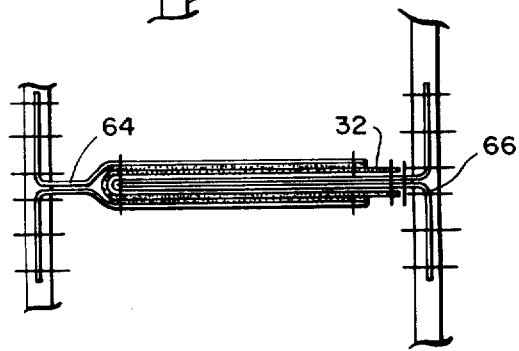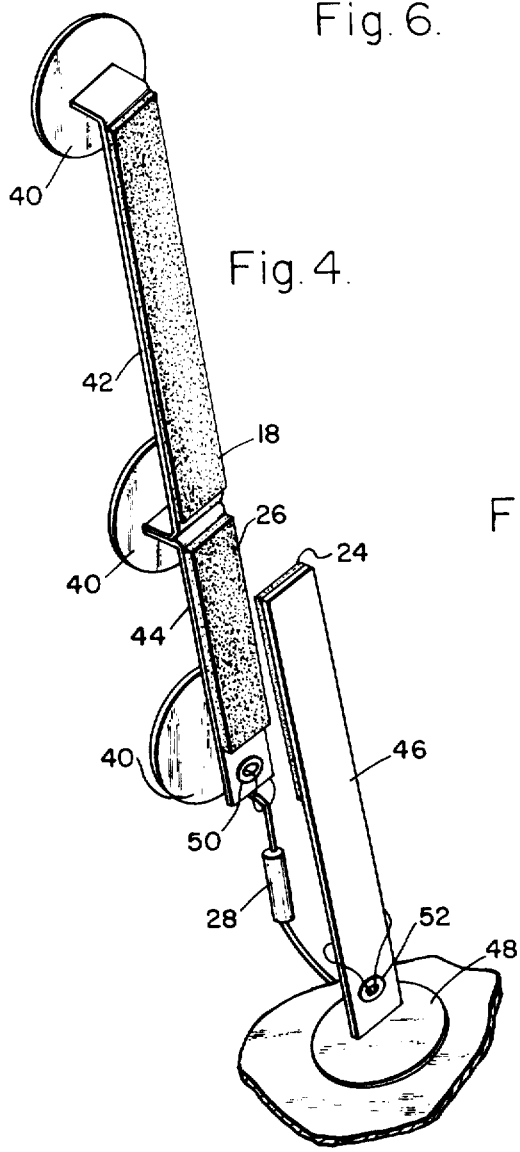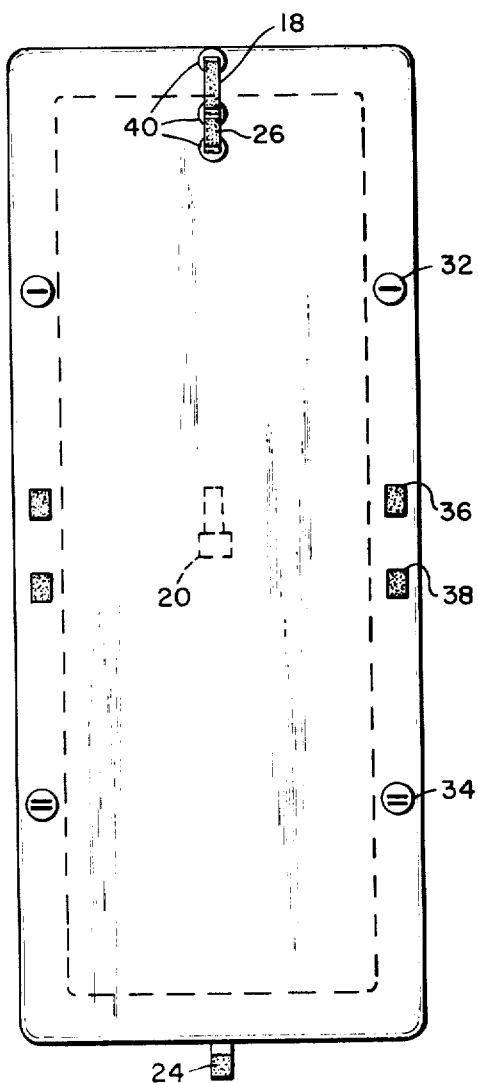

3,897,861

INFLATABLE EVACUATION SLIDE INTERMEDIATE RELEASE SYSTEM

BACKGROUND OF THE INVENTION

Whn an inflatable evacuation slide is initially deployed from an aircraft, it is necessary to restrain the slide from fully opening. While only a short interval of time lapses between deployment of the slide and full inflation of the slide, various ambient wind conditions can prevent proper deployment unless suitable restraints are provided. An example of such restraints is illustrated in U.S. Pat. No. 3,606,939. While this type of restraint has been used extensively and has been found to be satisfactory in many applications, it does not have the degree of preciseness which is desirable for the more sophisticated new applications. While the Velcro concept disclosed therein has minimum complexity and bulk, it is somewhat affected by temperature and humidity variations and thus difficult to control within a narrow range of the environmental extremes which must be tolerated. In addition, it is susceptible spurious loads and shifting loads which may greatly influence release.

SUMMARY OF THE INVENTION

The present invention achieves inflatable deployment dynamics that are both predictable and repeatable. A quarter tie maintains the inflatable folded approximately in lengthwise quarters during the initial deployment phase. In addition, a half tie restrains the inflatable in a half folded configuration following release of the quarter tie. This half tie includes a plurality of tie members to release in a staged manner.

BRIEF DESCRIPTION OF THE DRAWINGS

FIg. 3 is a schematic plan view of the fully inflated slide of FIGS. 1 and 2:

FIG. 4 is an enlarged isometric view of the primary half tie restraint; and

FIGS. 5 and 6 illustrate the secondary butterfly tabs in a disengaged and engaged position, respectively.

DESCRIPTION OF THE PREFERRED EMBODIMENTS

Figure 1:
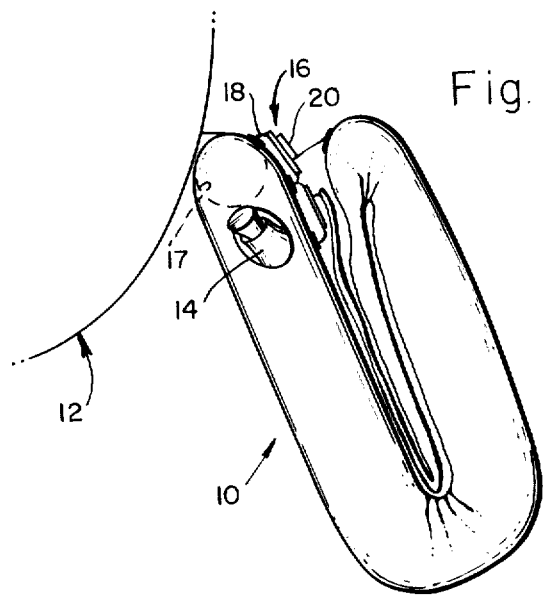
FIG. 1 is a side elevation view of an inflatable evacuation slide illustrating the quarter tie restraint.

FIG. 1 illustrates an inflatable evacuation slide 10 shortly after it has been deployed from an aircraft fuselage 12 and has just started to become inflated through an inflation system 14. In this position the slide 10 is folded in approximately lengthwise quarters to prevent the inflatable from digging in or extending under the aircraft fuselage 12 as it inflates rather than outward and away from the fuselage as intended. In this position the inflatable has a minimum frontal area or sail area to the presence of various ambient wind conditions. The quarter tie 16 maintains the slide 10 in this folded condition until sufficient gas pressure is built up in the tube across the top of the slide, known as the "door sill tube" 17, to establish a stable, firm contact with the fuselage 12. The quarter tie 16 comprises a quarter tie pile element panel 18 co-operable with a quarter tie hook element panel 20 to provide a hook and pile fastener means commonly known as a Velcro fastener. These Velcro fasteners are known to be strong in shear while relatively weak in peel. Shear load to peel load capability ratios in the vicinity of 15:1 are commonly exhibited.

Figure 2:
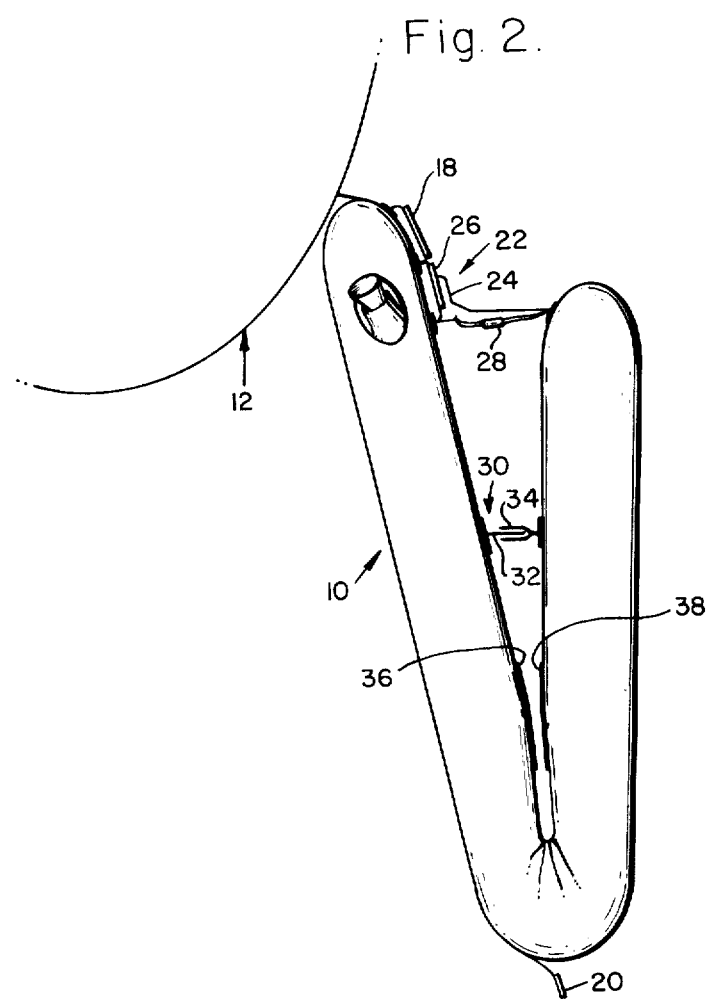
FIG. 2 is a side elevation view of the slide of FIG. 1 illustrating the half tie restraint.

As inflation of the inflatable evacuation slide 10 continues, sufficient gas pressure is built up within the inflatable to peel the hook element panel 20 from the pile element panel 18 and thus release the quarter tie 16. Upon release of the quarter tie the slide 10 will then distend to the half folded configuration as generally illustrated in FIG. 2. The inflatable slide 10 is maintained in this position by a plurality of half tie members. The primary half tie 22 comprises a half tie hook element panel 24 attached to the lower end of the slide 10 and half tie pile element panel 26, attached to the upper end of the slide 10 below the quarter tie pile element panel 18, and a frangible link 28 disposed between the upper and lower ends of the slide 10.

In addition, a plurality of secondary butterfly half tie restraints 30 are disposed between the lower half of the slide and the upper half of the slide in an intermediate position. This secondary butterfly restraint basically comprises an outwardly extending pile fastener 32 around which are engagingly disposed two hook fasteners 34.

Further, secondary Velcro shear panels 36 and 38 are disposed in the fold or crotch of the inflatable evacuation slide 10 in the half tie arrangement. Shear panel 36 would be the pile fastener while shear panel 38 would be the hook fastener.

This plurality of half tie restraints will maintain the inflatable in a half folded condition until the gas pressure established in the inflatable reaches a level sufficient at the time of half tie release to cause the inflatable to be fully extended and at a minimum usable pressure when the lower end of the inflatable first contacts the ground. The slide 10 is shown in a fully inflated condition in FIG. 3.

FIG. 4 illustrates the primary half tie arrangement 22. The quarter tie pile panel 18 and half tie pile panel 26 are affixed at the upper or fuselage end of the inflatable evacuation slide 10. A plurality of pads 40 cemented to the upper end of the slide surface affix a quarter tie webbing 42 and a half tie webbing 44 to the slide 10. The quarter tie pile panel 18 and half tie pile panel 26 are affixed to the webbings 42 and 44, respectively. The half tie hook panel 24 is affixed to the lower end of the evacuation slide by means of webbing 46 and pad 48. The frangible link 28 extends between a grommet 50 in webbing 44 and a grommet 52 at the base of webbing 46.

As illustrated in FIGS. 5 and 6, the secondary butterfly restrains 30 are likewise affixed to the evacuation slide by pads 60 and 62, respectively. The two hook panels 34 are affixed to webbing 64 held to by pad 60, while the two-sided pile panel 32 is disposed on either side of webbing 66 held by pad 62. FIG. 5 illustrates the secondary butterfly restraints prior to engagement while FIG. 6 illustrates them engaged.

The quarter tie release is accomplished in the conventional manner well known for Velcro type fasteners. On the other hand the half tie release is staged to produce a highly predictable and repeatable release. It is known that during the early stages of the half folded phase of the inflation cycle transient loads of a random nature occur. These loads are believed to be the consequence of motion of the inflating mass and ram effects from the high air mass flow rates into the inflatable. If these random loads are not isolated from the primary half tie release, they may add to the muscle force generated by the inflatable tube pressurization and cause premature release of the half tie.

The secondary butterfly tabs and the secondary Velcro shear panels serve to isolate the primary half tie release from many random loads and thus assure that only muscle forces, that is, forces resultant from inflatable tube pressure, are applied to the primary half tie release. The secondary restraints also prevent the half fold location from shifting during the deployment since any shift in this critical fold location could cause the loading vector on the primary half tie restraint to vary.

In operation the build-up of inflatable tube pressure will cause the primary Velcro shear panel to peel. The half tie hook panel 24 will peel from the half tie pile 26. Following separation of the shear panel, the frangible link 28 is required to maintain the half fold configuration until build-up of tube muscle force will cause the link to break. This frangible link serves as the actual half tie release measurement. It may consist of a loop fabricated from several turns of soft copper wire with a twisted and soldered termination of strand ends. The number of wire turns can be tailored to provide release under specific predetermined conditions. Other frangible links can also be utilized.

One the frangible link has released, there is sufficient tube muscle force to shear the secondary butterfly tabs and to peel the secondary Velcro shear panels such that the inflatable evacuation slide will achieve a fully inflated condition. In this manner a highly predictable and repeatable release can be obtained.

While specific embodiments of the invention have been illustrated and described, it is to be understood that these embodiments are provided by way of example only and that the invention is not to be construed as being limited thereto, but only by the proper scope of the following claims.

What we claim is:

1. Inflatable slide apparatus for evacuation from an elevated egress to a lower surface, comprising:
    a fluid distensible member, of a generally elongate configuration when fully inflated, disposed in an uninflated, folded configuration at the elevated egress with one end secured thereto; and
    means to restrain said fluid distensible member in a lengthwise half folded configuration during inflation thereof until a minimum gas pressure, sufficient to fully extend said member to contact the lower surface, is developed in said member,
    said half folded restraining means including primary restraint means responsive to muscle forces generated by the pressurization of said member and secondary restraint means isolating said primary restraint means from random transient deployment forces,
    said primary restraint means comprising a frangible link disposed between the two opposed ends of said fluid distensible member and said secondary restraint means includes at least one pair of butterfly hook and pile fastener elements disposed intermediate the half fold crotch and the two ends of said fluid distensible member, one of each pair of elements affixed to the lower half of said member and the other of each pair of elements affixed to the upper half of said member.

2. The inflatable slide apparatus of claim 1 wherein said secondary restraint means of said half folded restraining means additionally include means to prevent shifting of the half fold crotch location of said member, said shift preventing means comprising at least one pair of hook and pile fastener elements disposed in the crotch of the half fold, one of each pair of elements affixed to one surface of the half fold crotch and the other of each pair of elements affixed to the other surface of the half fold crotch.

3. Inflatable slide apparatus for evacuation from an elevated egress to a lower surface, comprising:
    a fluid distensible member, of a generally elongate configuration when fully inflated, disposed in an uninflated, folded configuration at the elevated egress with one end secured thereto;
    means to restrain said fluid distensible member in a lengthwise quarter folded configuration during an initial period of inflation until an initial gas pressure is developed in said member; and
    means to restrain said fluid distensible member in a lengthwise half folded configuration during a subsequent period of inflation until a minimal final gas pressure is developed in said member,
    said half folded restraining means including primary restraint means responsive to muscle forces generated by the pressurization of said member and secondary restraint means isolating said primary restraint means from random transient deployment forces,
    said primary restraint means comprising a frangible link disposed between the two opposed ends of said fluid distensible member,
    said secondary restraint means of said half folded restraining means comprising at least one pair of butterfly hook and pile fastener elements disposed intermediate the half fold crotch and the two ends of said fluid distensible member, one of each pair of elements affixed to the lower half of said member and the other of each pair of elements affixed to the upper half of said member and
    means to prevent shifting of the half fold crotch location of said member, said shift preventing means comprising at least one pair of hook and pile fastener elements disposed in the crotch of the half fold, one of each pair of elements affixed to one surface of the half fold crotch and the other of each pair of elements affixed to the other surface of the half fold crotch.

4. The inflatable slide apparatus of claim 3 wherein said quarter folded restraining means comprise a pair of hook and pile fastener elements, the first element disposed at the elevated end of said member and said second element operably disposed with respect to said first element at the outer surface of the half fold.

5. Inflatable slide apparatus for evacuation from an elevated egress hatchway of an aircraft to a lower surface upon which the aircraft is at rest, comprising:
    a flexible wall, fluid distensible member, of a generally elongate configuration when fully inflated, disposed in an uninflated, folded configuration at the elevated egress hatchway with one end secured adjacent said hatchway, said member including an elongate half fold and an elongate quarter fold;
    means to restrain said flexible wall, fluid distensible member in a lengthwise quarter folded configuration during an initial period of inflation until an initial gas pressure is developed in said member;

said quarter folded restraining means comprising a pair of hook and pile fastener elements, the first element disposed at the elevated end of said member and said second element operably disposed with respect to said first element at the outer surface of the half fold; and means to restrain said flexible wall, fluid distensible member in a lengthwise half folded configuration during a subsequent period of inflation until a minimum final gas pressure is developed in said member, said half folded restraining means including primary restraint means responsive to muscle forces generated by the pressurization of said member and secondary restraint means isolating said primary restraint means from random transient forces, said secondary restraint means including means to prevent shifting of the half fold location of said member.

6. The inflatable slide apparatus of claim 5 wherein said means to prevent shifting of the half fold location comprise at least one pair of hook and pile fastener elements disposed in the crotch of the half fold, one of each pair of elements affixed to one surface of the half fold crotch and the other of each pair of elements affixed to the other surface of the half fold crotch.

7. The inflatable slide apparatus of claim 5 wherein said primary restraint means comprise a frangible link disposed between the two opposed ends of said fluid distensible member.

8. The inflatable slide apparatus of claim 5 wherein said primary restraint means additionally include a pair of hook and pile fastener elements disposed between the two opposed ends of said fluid distensible member.

9. The inflatable slide apparatus of claim 5 wherein said secondary restraint means isolating said primary restraint means comprise at least one pair of butterfly hook and pile fastener elements disposed intermediate the half fold crotch and the two ends of said fluid distensible member, one of each pair of elements affixed to the lower half of said member and the other of each pair of elements affixed to the upper half of said member.

10. Inflatable slide apparatus for evacuation from an elevated egress hatchway of an aircraft to a lower surface upon which the aircraft is at rest, comprising:

a flexible wall, fluid distensible member, of a generally elongate configuration when fully inflated, disposed in an uninflated, folded configuration at the elevated egress hatchway with one end secured adjacent said hatchway, said member including an elongate half fold and an elongate quarter fold;

means to restrain said flexible wall, fluid distensible member in a lengthwise quarter folded configuration during an initial period of inflation until an initial gas pressure is developed in said member; and means to restrain said flexible wall, fluid distensible member in a lengthwise half folded configuration during a subsequent period of inflation until a minimum final gas pressure is developed in said member, said half folded restraining means including primary restraint means responsive to muscle forces generated by the pressurization of said member and secondary restraint means isolating said primary restraint means from random transient forces, said secondary restraint means including means to prevent shifting of the half fold location of said member, said secondary restraint means isolating said primary restraint means comprising at least one pair of butterfly hook and pile fastener elements disposed intermediate the half fold crotch and the two ends of said fluid distensible member, one of each pair of elements affixed to the lower half of said member and the other of each pair of elements affixed to the upper half of said member.

11. The inflatable slide apparatus of claim 10 wherein said means to prevent shifting of the half fold location comprise at least one pair of hook and pile fastener elements disposed in the crotch of the half fold, one of each pair of elements affixed to one surface of the half fold crotch and the other of each pair of elements affixed to the other surface of the half fold crotch.

12. The inflatable slide apparatus of claim 10 wherein said primary restraint means comprise a frangible link disposed between the two opposed ends of said fluid distensible member.

13. Inflatable slide apparatus for evacuation from an elevated egress hatchway of an aircraft to a lower surface upon which the aircraft is at rest, comprising:

a flexible wall, fluid distensible member, of a generally elongate configuration when fully inflated, disposed in an uninflated, folded configuration at the elevated egress hatchway with one end secured adjacent said hatchway, said member including an elongate half fold and an elongate quarter fold;

a pair of hook and pile fastener elements to restrain said flexible wall, fluid distensible member in a lengthwise quarter folded configuration during an initial period of inflation until an initial gas pressure is developed in said member, one fastener element disposed at the elevated end of said member and the other fastener element operably disposed with respect to said first element at the outer surface of the half fold; and means to restrain said flexible wall, fluid distensible member in a lengthwise half folded configuration during a subsequent period of inflation until a minimum final gas pressure is developed in said member, said half folded restraining means including a frangible link primary restraint element disposed between the two opposed ends of said fluid distensible member and responsive to muscle forces generated by the pressurization of said member and secondary restraint means isolating said primary restraint element from random transient deployment forces, said secondary restraint means including at least one pair of butterfly hook and pile fastener elements disposed intermediate the half fold crotch and the two ends of said fluid distensible member, one of each pair of fastener elements affixed to the lower half of said member and the other of each pair of fastener elements affixed to the upper half of said member, and also including at least one pair of hook and pile fastener elements disposed in the crotch of the half fold to prevent the shifting of the half fold location of said member, one of each pair of elements affixed to one surface of the half fold crotch and the other of each pair of elements affixed to the other surface of the half fold crotch.

* * * * *